(12) United States Patent
Chien et al.

(10) Patent No.: US 6,969,420 B2
(45) Date of Patent: Nov. 29, 2005

(54) METHOD OF COLLECTING NANOPARTICLES BY USING A CYCLONE AND METHOD OF DESIGNING THE CYCLONE

(75) Inventors: Hung-Min Chien, Hsinchu (TW); Yu-Du Hsu, Hsinchu (TW); Chuen Jinn Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 156 days.

(21) Appl. No.: 10/726,602

(22) Filed: Dec. 4, 2003

(65) Prior Publication Data

US 2005/0120880 A1    Jun. 9, 2005

(51) Int. Cl.[7] .............................................. B01D 45/16
(52) U.S. Cl. ........................................................ 95/271
(58) Field of Search ........................... 95/271; 55/399, 55/434, 459.1

(56) References Cited

U.S. PATENT DOCUMENTS

| | | | | |
|---|---|---|---|---|
| 4,482,363 A | * | 11/1984 | Mink | ........................... 95/271 |
| 4,714,541 A | * | 12/1987 | Buyan et al. | ................ 208/161 |
| 4,865,629 A | * | 9/1989 | Zievers et al. | ................. 95/268 |
| 4,969,934 A | * | 11/1990 | Kusik et al. | ................... 95/270 |
| 5,207,805 A | * | 5/1993 | Kalen et al. | ................... 95/271 |
| 5,961,701 A | * | 10/1999 | Hlynsky | ........................ 96/209 |
| 6,331,196 B1 | * | 12/2001 | Alperovitch | ............... 55/459.1 |
| 6,616,734 B2 | * | 9/2003 | Liu | .............................. 95/282 |
| 6,673,133 B2 | * | 1/2004 | Sechrist et al. | ................ 55/348 |

* cited by examiner

Primary Examiner—Frank M. Lawrence
(74) Attorney, Agent, or Firm—Bacon & Thomas PLLC

(57) ABSTRACT

A cyclone is used to collect nanoparticles and is formed of a chamber, and a guide wing located in the chamber such that the guide wing and the chamber form a passage. A flow entraining the nanoparticles is moved through the passage in such a way that the flow is caused to spin rapidly, and that the nanoparticles, acted on by a centrifugal force, are thereby resulting in collision with the chamber wall. The cyclone has a nanoparticle cut-off aerodynamic diameter, which is reduced by virtue of the phenomena that the particle inertia increases in a low pressure environment, and that the particle slipping correction factor increases under low pressure, and that the rebound of the particle in the cyclone chamber tends to alleviate under low pressure. The cyclone is used to remove nanoparticles from industrial exhaust fumes.

6 Claims, 3 Drawing Sheets

METHOD OF COLLECTING NANOPARTICLES BY USING A CYCLONE AND METHOD OF DESIGNING THE CYCLONE

FIELD OF THE INVENTION

The present invention relates generally to a cyclone used to collect nanoparticles, and more particularly to a method of collecting nanoparticles using the cyclone.

BACKGROUND OF THE INVENTION

The fabrication of semiconductor or optoelectronic process releases the exhaust fumes containing harmful gases and particles, such as silicon dioxide particles and arsenic particles. The exhaust fumes are first transferred by a vacuum pump to local scrubber in which the exhaust fumes are disposed of by burning and scrubbing. Such a disposal method as described above is limited in effect in that most of the submicron particles are not effectively washed away, and that most of the particles are discharged into the atmospheric air, thereby resulting in air pollution. The main culprit is that the silicon dioxide particles and the arsenic particles are much smaller than one micron and can not be therefore disposed of effectively by scrubbing. In addition, these particles are apt to deposit in the pipeline of the vacuum pump. It is conceivable that the deposition of the particles will eventually result in obstruction of the pipeline of the vacuum pump. On the other hand, nanotechnology application is the future trend of the high-tech industry. Accordingly, there will be nanoparticle pollution which is resulted from the discharge or loss of the nanoparticles amid the production of the nanomaterials. The unwanted nanoparticles can not be effectively disposed of by means of traditional methods. It is therefore readily apparent that research and development of preventive method and apparatus of the nanoparticle pollution are urgently called for.

Cyclone is generally used under normal pressure to remove particles having an aerodynamic diameter ranging from one to ten or more micron. The conventional cyclone dust collectors are mostly of a tangential flow design, with very few of them being of an axial flow design. As far as the research on the axial flow cyclone is concerned, Liu and Rubow disclosed A NEW AXIAL FLOW CASCADE CYCLONE FOR SIZE CHARACTERIZATION OF AIRBORNE PARTICULATE MATTER (Liu, B. Y. H. and RUBOW, K. L., 1984). In addition, Liu, Pui, and Fissan disclosed a step-by-step axial flow cyclone (AEROSOLS, PP. 115–118, Elsevier, Amsterdam) and the experimental data of the particle collection efficiency and the particle loss of each step, with the flow of each step being 30 standard liters per minute (abbreviated as slpm), and with the cut-off aerodynamic diameters being 12.2; 7.9; 3.6; 2.05; and 1.0 $\mu$m. Weiss et al. disclosed two kinds of axial flow cyclones which are adapted to collect the particle sample in a workplace. (Weiss, Z., Martinec, P. and Vitk, J., 1987, Vlastnosti Dulnibo Prachu A Zaklady Protiprasne Techniky, Prague, SNTL). The flows of the two axial flow cyclones are respectively 8 and 50 slpm, whereas the cut-off aerodynamic diameters are respectively 4.8 $\mu$m and 3.0 $\mu$m. Vaughan made a variety of axial flow cyclones (Vaughan, N. P., 1988, Construction and Testing of An Axial Flow Cyclone Preseparator, J. AEROSOL SCI., 19 (3): 295–305). As the flows of these axial flow cyclones remain between 1.24 and 3.75 slpm, the cut-off aerodynamic diameters remain in the range of 1.6–6.5 $\mu$m. The afore-mentioned researches were conducted under the atmospheric pressure on the efficiency of the cyclone dust collectors. There is a lack of research literature on the efficiency of the cyclone dust collectors under low pressure.

SUMMARY OF THE INVENTION

The primary objective of the present invention is to provide a cyclone dust collector for capturing nanoparticles in a gas flow. The cyclone dust collector of the present invention is designed on the principle that the resistance to the nanoparticle movement is reduced under low pressure, and that the inertia of the nanoparticle is increased under low pressure. The cyclone dust collector of the present invention is effective in removing the ultrafine particles which are released from the manufacturing pipeline, thereby averting the nanoparticle pollution in the environment in which we live.

The present invention makes use of the theoretical formula to infer the relationship between the collection efficiency and the size, the flow, the vacuum pressure, and the particle aerodynamic diameter. The design of the cyclone of the present invention is based on such inference. The cyclone so designed is subjected to a series of experimental tests. On the basis of the experimental data of the collection efficiency, the particle diameter of 50% collection efficiency (cut-off aerodynamic diameter, $d_{pa50}$) is confirmed to be in the range of nanoparticle diameter. In view of the fact that the inertia of the particle increases in a vacuum environment, and that the particle slipping correction factor increases in the vacuum environment, thereby resulting in reduction in the cut-off aerodynamic diameter, $d_{pa50}$, of the cyclone, the extent of rebound of the particles from the chamber wall of the cyclone of the present invention is so reduced as to enhance the collection efficiency and the collection capacity of the cyclone of the present invention.

The features and the advantages of the present invention will be more readily understood upon a thoughtful deliberation of the following detailed description of the preferred embodiments of the present invention with reference to the accompanying drawings.

DETAILED DESCRIPTION OF THE PREFERRED EMBODIMENTS

Figure 1:
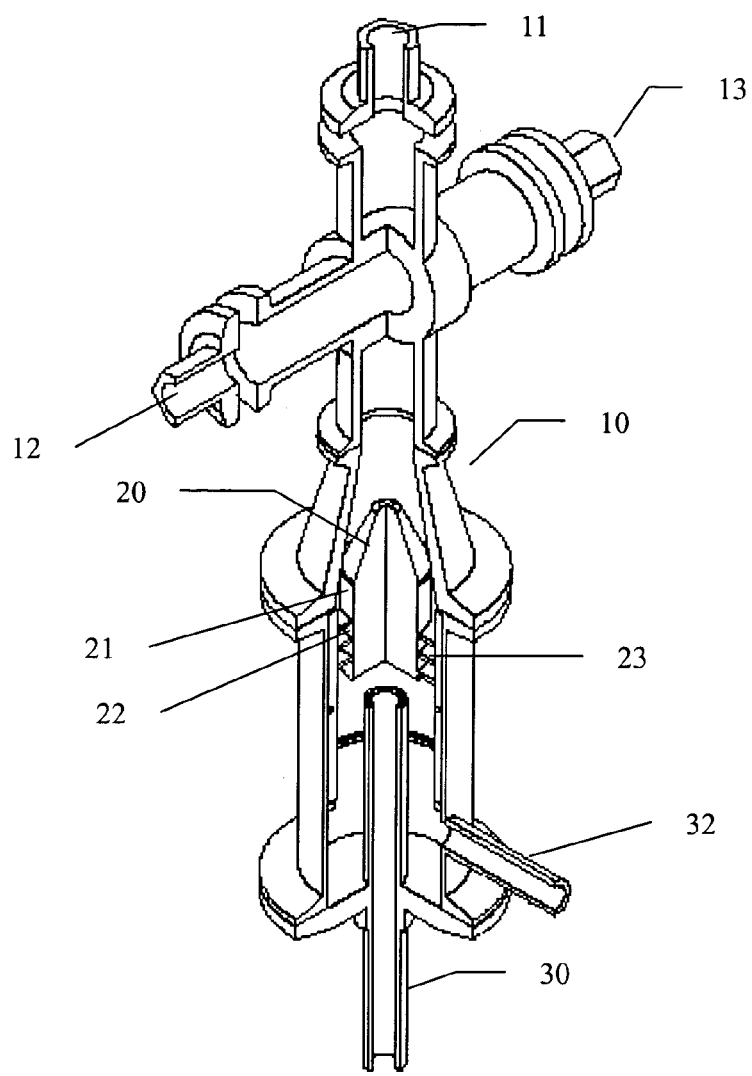
FIG. 1 shows a partial sectional view of an axial flow helical cyclone of a first preferred embodiment of the present invention.

The present invention discloses a method of collecting nanoparticles using a cyclone, said method comprising a process of passing a nanoparticle flow through the cyclone in such a way that the nanoparticle flow has a pressure smaller than 20 torr in the course of passing through the cyclone.

Preferably, the cyclone is an axial flow helical cyclone comprising a chamber and a whirling mechanism, said chamber being provided with an entrance for admitting the nanoparticle flow into the cyclone, and an exit for discharging the nanoparticle flow from the cyclone, said whirling mechanism being located in said chamber in such a manner that said whirling mechanism is located between said entrance and said exit of said chamber, and that said whirling mechanism and an inner wall of said chamber form a passage for the nanoparticle flow to pass through while the nanoparticle flow is caused to whirl, so that nanoparticles entrained in the nanoparticle flow are acted on by a centrifugal force to collide with the inner wall of said chamber. Preferably, said whirling mechanism comprises a cylindrical body; and a continuous spiral guide wing piece or a plurality of segmented spiral guide wing pieces disposed on an outer surface of said cylindrical body and circumventing an axis of said cylindrical body; wherein said passage is defined by said spiral guide wing piece or pieces, the outer surface of said cylindrical body and the inner wall of said chamber contiguous to said spiral guide wing piece or pieces.

Preferably, said cyclone has an cut-off aerodynamic diameter ($d_{pa50}$) ranging from 10 to 200 nm.

Preferably, said cyclone has a theoretical cut-off aerodynamic diameter in the range of 1–100 nm, which is computed by an equation as follow:

$$d_{pa50} = 0.106 \left( \frac{P_{cyc}}{P_{760}} \right)^2 \frac{\mu (r_{max}^2 - r_{min}^2)^2 (P - N\ w)}{\rho_{po} n \zeta Q_0 r_{min}^2 N^2\ \lambda_0}$$

in which $P_{cyc}$ stands for pressure, expressed in unit of torr, in the interior of the cyclone; $P_{760}$, 760 torr; $Q_o$, flow rate of the nanoparticle flow under normal pressure and temperature; $\lambda_o$, mean free path of air molecule under normal pressure and temperature; $\mu$, viscosity of gas of the nanoparticle flow; $r_{max}$, maximum radius of the guide wing piece; $r_{min}$, minimum radius of the guide wing piece; P, interval of guide wing pieces; N, number of the guide wing pieces; w, thickness of the guide wing piece; $\rho_{po}$, nanoparticle density; n, loop number of the guide wing piece; $\zeta$ a fitting constant enabling the theoretical efficiency to conform with the experimental data disclosed in the research literatures.

The present invention also discloses a method of making an axial flow helical cyclone for use in collecting nanoparticles, said axial flow helical cyclone comprising a chamber and a whirling mechanism, said chamber being provided with an entrance for admitting a flow entraining the nanoparticles into the cyclone, and an exit for discharging the flow from the cyclone, said whirling mechanism being located in said chamber such that said whirling mechanism is located between said entrance and said exit, said whirling mechanism comprising a cylindrical body and a continuous spiral guide wing piece or a plurality of segmented spiral guide wing pieces disposed on an outer surface of said cylindrical body and circumventing an axis of said cylindrical body, wherein a passage is defined by said spiral guide wing piece or pieces, the outer surface of said cylindrical body and an inner wall of said chamber contiguous to said spiral guide wing piece or pieces, said passage being used for the nanoparticle flow to pass through while the nanoparticle flow is caused to whirl, so that nanoparticles entrained in the nanoparticle flow are acted on by a centrifugal force to collide with the inner wall of said chamber, wherein said method comprises making said cyclone so that said cyclone have a theoretical cut-off aerodynamic diameter in the range of 1–100 nm, which is computed by the above-mentioned equation.

Figures 2, 4:
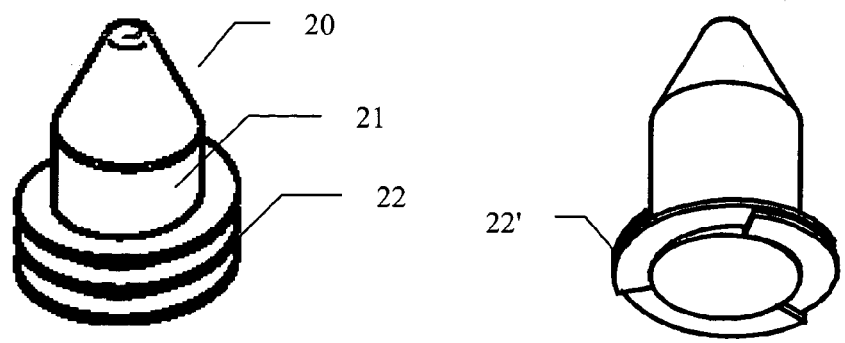
FIG. 2 shows a perspective view of a guide wing of the first preferred embodiment of the present invention.
FIG. 4 shows a perspective view of a guide wing of a second preferred embodiment of the present invention.

As shown in FIGS. 1 and 2, an axial flow helical cyclone embodied in the present invention comprises a chamber 10 and a guide wing 20 located in the chamber 10. The chamber 10 is provided at the top with an entrance 11 via which the external gas stream enters the chamber 10. The chamber 10 is further provided with a first port 12 which is located in proximity of the entrance 11 for connecting a pressure gauge (not shown in the drawings). The guide wing 20 has a cylindrical body 21, which is provided on the outer surface with a spiral guide wing piece 22 circumventing the cylindrical body 21 three rounds. The spiral guide wing piece 22 has an outer diameter equal to or slightly smaller than an inner diameter of the chamber 10. The spiral wing piece 22, the outer surface of the cylindrical body 21 and an inner wall of the chamber 10 contiguous to the spiral wing piece 22 form and define a spiral passage 23. An exit pipe 30 is mounted at the bottom of the chamber 10 such that the exit pipe 30 is aligned with an axial direction of the chamber 10, and that the top end of the exit pipe 30 is located in proximity of the bottom of the cylindrical body 21, and that the bottom end of the exit pipe 30 is adapted to fasten with a vacuum pipe (not shown in the drawing). The chamber 10 is further provided with a second port 32 adjacent to the exit pipe 30. The second port 32 is connected with the pressure gauge. A vacuum adjustment flange valve 13 is fastened to the chamber 10 such that the valve 13 is opposite to the first port 12, and that the valve 13 is connected to the vacuum pump by a bypass pipe (not shown in the drawing).

The entrance 11 is connected to a pipeline for conveying a nanoparticle-containing gas stream. As the vacuum pump is started, the gas stream enters the chamber 10 via the entrance 11. The gas stream is caused to whirl while passing through the spiral passage 23. The nanoparticles of the gas stream are caused by a centrifugal force to collide with the inner wall of the chamber 10, thereby resulting in collection of the nanoparticles in the chamber 10. The gas stream with a reduced amount of the nanoparticles is discharged via the exit pipe 30. The vacuum adjustment valve 13 is used to adjust the pressure in the chamber 10, which is measured by means of the pressure gauge mounted at the first port 12 and the second port 32.

Theoretically speaking, a particle-containing gas is guided by the guide wing piece to whirl while passing through the axial flow helical cyclone. In light of a centrifugal force exerting on the particles, the particles are caused to move outward in a radial direction. In another words, the particles come into violent contact with the inner wall of the chamber of the cyclone, thereby resulting in the trapping of the particles.

The collection efficiency η of the particles is computed by the following equation (1):

$$\eta = 4\pi n \zeta St/(1 + r_{max}/r_{min}) \quad (1)$$

in which η stands for the number of encircle in the guide wing; $r_{max}$, maximum radius of the guide wing piece; $r_{min}$, minimum radius of the guide wing piece; ζ, fitting constant; St, Stokes' constant, $St = \tau v_t/(r_{max} - r_{min})$, τ being relaxation time of particle, Vt being tangential speed of the gas inside the guide wing.

The particle slipping correction factor C is computed by the following equation (2). Please refer to Hinds, W. C., 1999, Aerosol Technology, $2^{nd}$ Ed., Wiley & Sons, Inc., pp. 49.

$$C = 1 + \frac{\lambda}{d_p}\left[2.34 + 1.05\exp\left(-0.39\frac{d_p}{\lambda}\right)\right] \quad (2)$$

in which λ stands for mean free path of gas molecule, its value being inversely proportional to gas pressure and being directly proportional to gas temperature T; $d_p$, particle diameter.

When the degree of vacuum is high in the interior of the cyclone, or when the pressure $P_{cyc}$ in the interior of the cyclone is smaller than 20 torr, $C = 3.39\lambda/d_p$. The particle cut-off aerodynamic diameter $d_{pa50}$ is computed by the following equation (3).

$$d_{pa50} = 0.106\left(\frac{P_{cyc}}{P_{760}}\right)^2 \frac{\mu(r_{max}^2 - r_{min}^2)^2(P - N\,w)}{\rho_{po} n \zeta Q_0 r_{min}^2 N^2 \lambda_0} \quad (3)$$

The unit of the interior pressure, $P_{cyc}$, of the cyclone is torr. $P_{760}$ stands for 760 torr (1 atmospheric pressure). $Q_0$ stands for the gas flow rate under normal pressure and temperature (1 atm, 20° C.). $\lambda_o$ stands for mean free path of air molecule under normal pressure and temperature. μ stands for viscosity of gas. $r_{max}$ stands for maximum radius of guide wing piece. $r_{min}$ stands for minimum radius of guide wing piece. P stands for pitch of the guide wing pieces. N stands for number of guide wing pieces. w stands for thickness of guide wing pieces. $\rho_{po}$ stands for particle density. n stands for number of rotation of guide wing pieces. ζ stands for a fitting constant enabling the theoretical efficiency to conform with the experimental data.

The present invention will be elucidated with reference to the following embodiments, which are merely illustrative.

Embodiment 1

As shown in FIGS. 1 and 2, the cyclone of the present invention has a continuously spiral guide wing, thereby resulting in formation of three loops of guide wing piece. The guide wing piece has a maximum radius of $r_{max}$=1.5 cm, and a minimum radius of $r_{min}$=1.0 cm. The pitch of the guide wing pieces is P=0.5 cm. The standard flows of the test were 0.455 and 1.0 slpm. The pressure at the entrance of the cyclone was 13 torr (at 1 slpm), or 6 torr (at 0.455 slpm). According to the equation (3), the theoretical cut-off aerodynamic diameters $d_{pa50}$ of the axial flow helical cyclone of the present invention are respectively 50 and 7 nm (fitting constant being 1) under the circumstances that the entrance pressures are respectively 13 torr (at 1 slpm), and 6 torr (at 0.455 slpm).

Figure 3A:
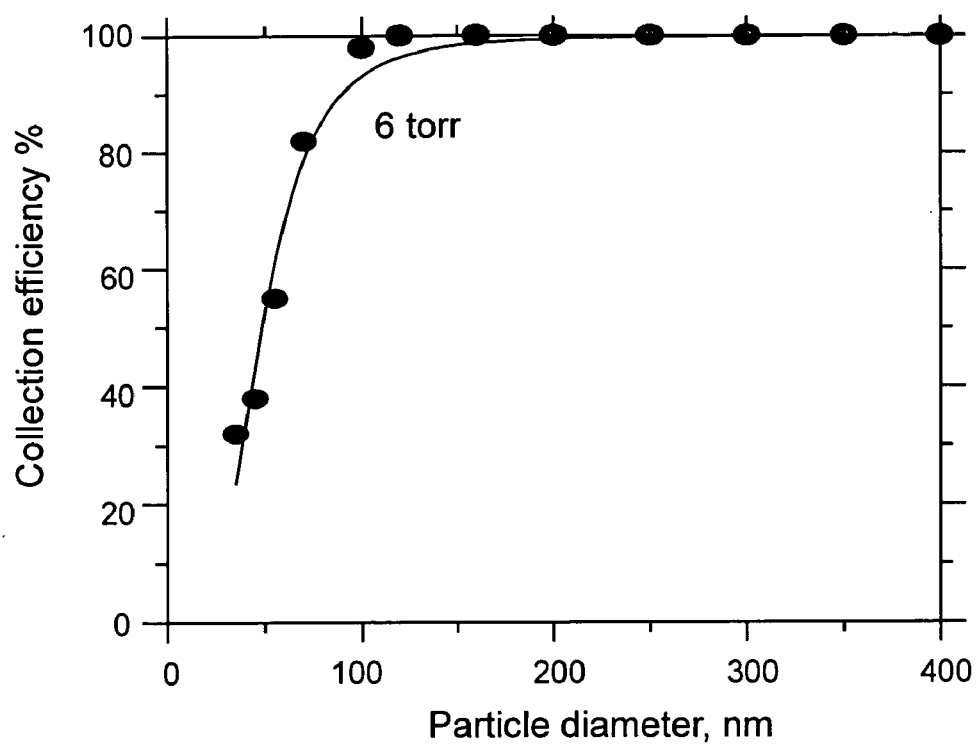
FIG. 3a is a diagram showing the relationship between the collection efficiency and the particle diameter of oleic acid, with the pressure at an entrance of the cyclone of the first preferred embodiment of the present invention being 6 torr (0.455 slpm).
Figure 3B:
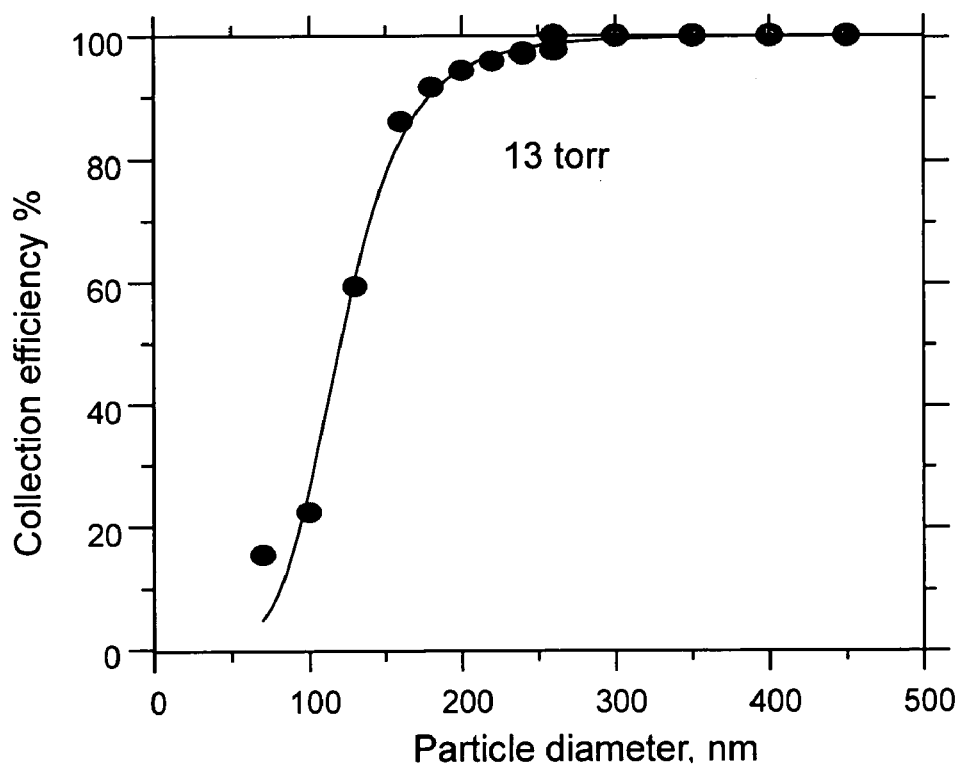
FIG. 3b is a diagram showing the relationship between the collection efficiency of the first preferred embodiment of the present invention and the particle diameter of oleic acid, with the pressure at the entrance of the cyclone of the present invention being 13 torr (1 slpm).

The axial flow helical cyclone of the present invention was used to collect oleic acid particles. The oleic acid has a density $\rho_o$ of 894 kg/m$^3$. The oleic acid particles had a diameter ranging from 35 nm to 460 nm. FIGS. 3a and 3b show the relationship between the collection efficiency and the particle diameter of the oleic acid particles, wherein the entrance pressure of the cyclone is 6 torr (at 0.455 slpm) in FIG. 3a, and the entrance pressure of the cyclone is 13 torr (at 1 slpm) in FIG. 3b. It is apparent that the cut-off aerodynamic diameter of the axial flow helical cyclone of the present invention has a very significant correlation with the flow and the pressure. As shown in FIG. 3b, the cut-off aerodynamic diameter, $d_{pa50}$, of the cyclone of the present invention is 108 nm at the time when the pressure at the entrance of the cyclone is 13 torr (at 1 slpm). As shown in FIG. 3a, the cut-off aerodynamic diameter, $d_{pa50}$, of the cyclone of the present invention drops to 43 nm at the time when the pressure at the entrance of the cyclone is reduced to 6 torr (at 0.455 slpm). These experimental results serve to demonstrate the workability of the cyclone of the present invention in terms of nanoparticle collection under the circumstances that the cyclone of the present invention is provided with an appropriate degree of vacuum.

Embodiment 2

An axial flow helical cyclone of the second preferred embodiment of the present invention is basically similar in construction to that of the first preferred embodiment described above, except that the former comprises three guide wing pieces 22', each being segmented, as shown in FIG. 4. Each guide wing piece 22' rotates 0.5 loop.

Figure 5A:
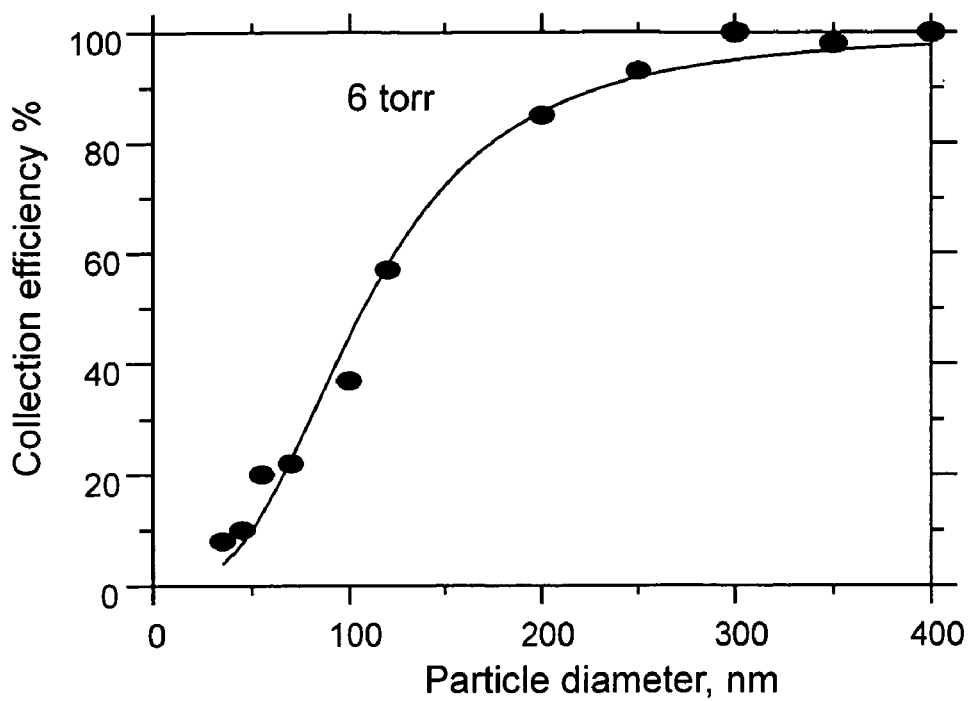
FIG. 5a is a diagram showing the relationship between the collection efficiency of the second preferred embodiment of the present invention and the particle diameter of oleic acid, with the pressure at an entrance of the cyclone being 6 tour (0.455 slpm).
Figure 5B:
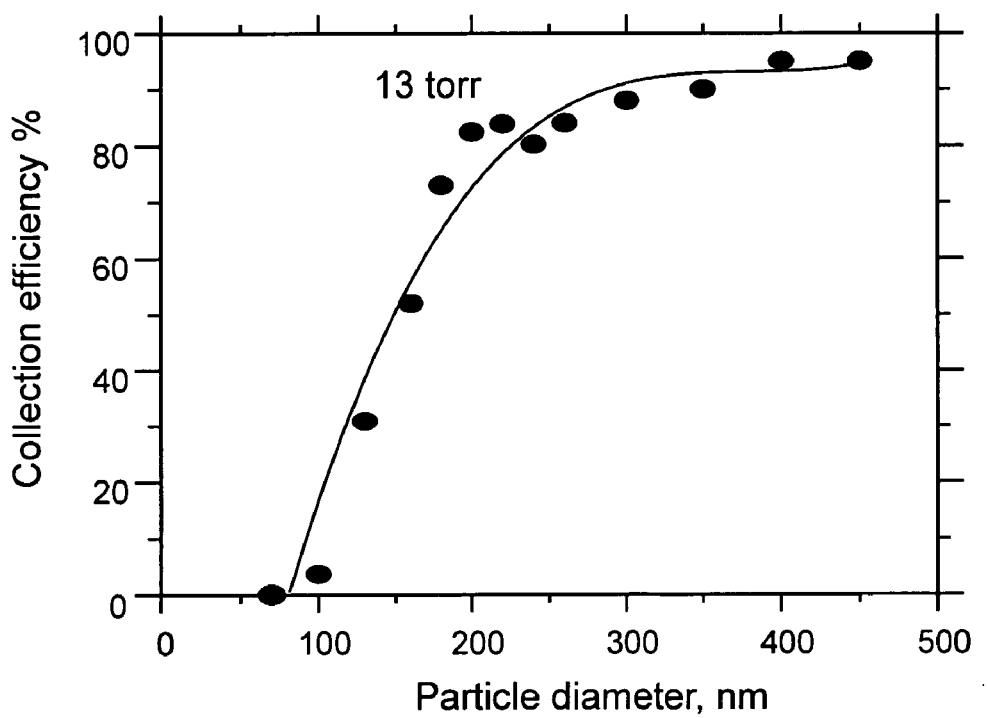
FIG. 5b is a diagram showing the relationship between the collection efficiency of the second preferred embodiment of the present invention and the particle diameter of oleic acid, with the pressure at the entrance of the cyclone being 13 torr (1 slpm).

The axial flow helical cyclone of the second preferred embodiment of the present invention was used to collect the oleic acid particles. The correlations between the collection efficiency of the cyclone and the oleic acid particle diameter are shown in FIGS. 5a and 5b. The pressure at the entrance of the cyclone is 6 torr (at 0.455 slpm), as shown in FIG. 5a. On the other hand, the pressure at the entrance of the cyclone is increased to 13 torr (at 1 slpm), as shown in FIG. 5b. It is apparent that the cut-off aerodynamic diameter of the axial flow helical cyclone of the present invention has a very significant correlation with the flow and the pressure. As shown in FIG. 5b, the cut-off aerodynamic diameter, $d_{pa50}$, of the cyclone of the present invention is 140 nm at the time when the pressure at the entrance of the cyclone is 13 torr (at 1 slpm). The cut-off aerodynamic diameter, $d_{pa50}$, of the cyclone of the present invention drops to 102 nm at the time when the pressure at the entrance of the cyclone is lowered to 6 torr (at 0.455 slpm), as shown in FIG. 5a.

The embodiments of the present invention described above are to be regarded in all respects as being illustrative and nonrestrictive. Accordingly, the present invention may be embodied in other specific forms without deviating from the spirit thereof. The present invention is therefore to be limited only by the scopes of the following claims.

What is claimed is:

1. A method of collecting nanoparticles using a cyclone, said method comprising a process of passing a nanoparticle flow through the cyclone in such a way that the nanoparticle flow has a pressure smaller than 20 torr in the course of passing through the cyclone.

2. The method as defined in claim 1, wherein the cyclone is an axial flow helical cyclone comprising a chamber and a whirling mechanism, said chamber being provided with an entrance for admitting the nanoparticle flow into the cyclone, and an exit for discharging the nanoparticle flow from the cyclone, said whirling mechanism being located in said chamber in such a manner that said whirling mechanism is located between said entrance and said exit of said chamber, and that said whirling mechanism and an inner wall of said chamber form a passage for the nanoparticle flow to pass through while the nanoparticle flow is caused to whirl, so that nanoparticles entrained in the nanoparticle flow are acted on by a centrifugal force to collide with the inner wall of said chamber.

3. The method as defined in claim 2, wherein said whirling mechanism comprises a cylindrical body; and a continuous spiral guide wing piece or a plurality of segmented spiral guide wing pieces disposed on an outer surface of said cylindrical body and circumventing an axis of said cylindrical body; wherein said passage is defined by said spiral guide wing piece or pieces, the outer surface of said cylindrical body and the inner wall of said chamber contiguous to said spiral guide wing piece or pieces.

4. The method as defined in claim 3, wherein said cyclone has an cut-off aerodynamic diameter ($d_{pa50}$) ranging from 10 to 200 nm.

5. The method as defined in claim 3, wherein said cyclone has a theoretical cut-off aerodynamic diameter in the range of 1–100 nm, which is computed by an equation as follow:

$$d_{pa50} = 0.106 \left(\frac{P_{cyc}}{P_{760}}\right)^2 \frac{\mu(r_{max}^2 - r_{min}^2)^2 (P - N \, w)}{\rho_{po} n \zeta Q_0 r_{min}^2 N^2 \, \lambda_0}$$

in which $P_{cyc}$ stands for pressure, expressed in unit of torr, in the interior of the cyclone; $P_{760}$, 760 torr; $Q_o$, flow rate of the nanoparticle flow under normal pressure and temperature; $\lambda_o$, mean free path of air molecule under normal pressure and temperature; $\mu$, viscosity of gas of the nanoparticle flow; $r_{max}$, maximum radius of the guide wing piece; $r_{min}$, minimum radius of the guide wing piece; P, interval of guide wing pieces; N, number of the guide wing pieces; w, thickness of the guide wing piece; $\rho_{po}$, nanoparticle density; n, loop number of the guide wing piece; $\zeta$ a fitting constant enabling the theoretical efficiency to conform with the experimental data disclosed in the research literatures.

6. A method of making an axial flow helical cyclone for use in collecting nanoparticles, said axial flow helical cyclone comprising a chamber and a whirling mechanism, said chamber being provided with an entrance for admitting a flow entraining the nanoparticles into the cyclone, and an exit for discharging the flow from the cyclone, said whirling mechanism being located in said chamber such that said whirling mechanism is located between said entrance and said exit, said whirling mechanism comprising a cylindrical body and a continuous spiral guide wing piece or a plurality of segmented spiral guide wing pieces disposed on an outer surface of said cylindrical body and circumventing an axis of said cylindrical body, wherein a passage is defined by said spiral guide wing piece or pieces, the outer surface of said cylindrical body and an inner wall of said chamber contiguous to said spiral guide wing piece or pieces, said passage being used for the nanoparticle flow to pass through while the nanoparticle flow is caused to whirl, so that nanoparticles entrained in the nanoparticle flow are acted on by a centrifugal force to collide with the inner wall of said chamber, wherein said method comprises making said cyclone so that said cyclone have a theoretical cut-off aerodynamic diameter in the range of 1–100 nm, which is computed by an equation as follows:

$$d_{pa50} = 0.106 \left(\frac{P_{cyc}}{P_{760}}\right)^2 \frac{\mu(r_{max}^2 - r_{min}^2)^2 (P - N \, w)}{\rho_{po} n \zeta Q_0 r_{min}^2 N^2 \, \lambda_0},$$

in which $P_{cyc}$ stands for pressure in the interior of the cyclone and is smaller than 20 torr; $P_{760}$, 760 torr; $Q_o$, flow of the nanoparticle flow under normal pressure and temperature; $\lambda_o$, mean free path of air molecule under normal pressure and temperature; $\mu$, viscosity of gas of the nanoparticle flow; $r_{max}$, maximum radius of guide wing piece; $r_{min}$, minimum radius of the guide wing piece; P, pitch of the guide wing pieces; N, number of the guide wing piece; w, thickness of the guide wing piece; $\rho_{po}$, nanoparticle density; n, loop number of the guide wing piece; $\zeta$, a fitting constant enabling the theoretical efficiency to conform with the experimental data disclosed in the research literatures.

* * * * *